(12) United States Patent
Henery (10) Patent No.: US 11,468,120 B2
(45) Date of Patent: Oct. 11, 2022

(54) AID FOR DYSLEXIC READERS

(71) Applicant: Patricia Henery, San Francisco, CA (US)

(72) Inventor: Patricia Henery, San Francisco, CA (US)

( * ) Notice: Subject to any disclaimer, the term of this patent is extended or adjusted under 35 U.S.C. 154(b) by 0 days.

(21) Appl. No.: 16/983,014

(22) Filed: Aug. 3, 2020

(65) Prior Publication Data

US 2020/0364265 A1 Nov. 19, 2020

Related U.S. Application Data (63) Continuation of application No. 14/734,330, filed on Jun. 9, 2015, now Pat. No. 10,733,235.

(51) Int. Cl.
*G06F 16/903* (2019.01)
*G06F 40/109* (2020.01)

(52) U.S. Cl.
CPC .......... *G06F 16/903* (2019.01); *G06F 40/109* (2020.01)

(58) Field of Classification Search
CPC .............................. G06F 16/903; G06F 40/109
USPC ................................................. 715/200, 256
See application file for complete search history.

(56) References Cited

U.S. PATENT DOCUMENTS

| | | | |
|---|---|---|---|
| 4,582,441 A | 4/1986 | Carter et al. | |
| 5,875,429 A | 2/1999 | Douglas | |
| 6,212,497 B1 | 4/2001 | Araki et al. | |
| 6,324,511 B1 | 11/2001 | Kiraly et al. | |
| 7,328,409 B2 | 2/2008 | Awada et al. | |
| 7,451,398 B1 | 11/2008 | Rohrs | |
| 7,461,351 B2 | 12/2008 | Bailey et al. | |
| 7,539,939 B1* | 5/2009 | Schomer | G06F 40/109 715/269 |
| 7,594,171 B2* | 9/2009 | Menninga | G06F 40/103 715/244 |
| 7,725,307 B2 | 5/2010 | Bennett | |
| 8,209,601 B2* | 6/2012 | Bever | G06F 40/289 715/244 |
| 8,306,356 B1 | 11/2012 | Bever et al. | |

(Continued)

OTHER PUBLICATIONS

Russian Intellectual Property Office, International Search Report and Written Opinion in corresponding International application No. PCT/US2016/036429 dated Aug. 1, 2016.

(Continued)

*Primary Examiner* — Manglesh M Patel
(74) *Attorney, Agent, or Firm* — Young Basile Hanlon & MacFarlane, P.C.

(57) ABSTRACT

Text for display on a user device may be modified or adjusted. A first user interface element and a second user interface element of at least two user interface elements are concurrently displayed at a computing device. The first user element displays sample text using first text settings, the second user element displays the sample text using second text settings, the sample text comprises multiple words, and a setting of the second text settings is different within the first text settings than within the second text settings such that the sample text displayed by the first user element is visually different from the sample text displayed by the second user element. A selection of one of the at least two user interface elements is received, and the text settings associated with the selected user interface elements are stored as default text settings.

18 Claims, 4 Drawing Sheets

(56) References Cited

U.S. PATENT DOCUMENTS

| | | |
|---|---|---|
| 8,315,879 B2 | 11/2012 | Mien, Jr. et al. |
| 8,464,149 B2 | 6/2013 | Griffin et al. |
| 8,886,518 B1 | 11/2014 | Wang et al. |
| 9,128,994 B2 | 9/2015 | Smolinski et al. |
| 2002/0099744 A1 | 7/2002 | Coden et al. |
| 2002/0152255 A1 | 10/2002 | Smith et al. |
| 2003/0117365 A1 | 6/2003 | Shteyn |
| 2004/0122941 A1 | 6/2004 | Creamer et al. |
| 2004/0205579 A1 | 10/2004 | Brassell et al. |
| 2004/0205642 A1 | 10/2004 | Menninga |
| 2005/0228642 A1 | 10/2005 | Mau et al. |
| 2007/0061132 A1 | 3/2007 | Bodin et al. |
| 2007/0198945 A1 | 8/2007 | Sun et al. |
| 2008/0222518 A1 | 9/2008 | Walker |
| 2008/0260210 A1 | 10/2008 | Kobeli et al. |
| 2009/0132384 A1* | 5/2009 | Duncan .................. G06F 16/30 705/26.1 |
| 2013/0030815 A1 | 1/2013 | Madhvanath et al. |
| 2014/0325455 A1* | 10/2014 | Tobin .................. G06F 3/04815 715/850 |
| 2015/0220503 A1 | 8/2015 | Landau |
| 2015/0279367 A1 | 10/2015 | Hrabak |
| 2015/0279371 A1 | 10/2015 | Fujioka |
| 2017/0293598 A1 | 10/2017 | Abu-Huwaij |

OTHER PUBLICATIONS

Nuance, naturallyspeaking-Documentation, May 11, 2015 (wayback), Nuance, pp. 1-2.

TextHelp , Read & Write Gold Beginners Guide, published May 2013, textHelp, Version 11, pp. 1-41 (pdf).

Spector Lincoln, Automatic Capitalization, published Feb. 25, 2011, PCWorld, pp. 1-2 (pdf).

* cited by examiner

AID FOR DYSLEXIC READERS

CROSS-REFERENCE TO RELATED APPLICATION

This application is a continuation of U.S. patent application Ser. No. 14/734,330, filed on Jun. 9, 2015, now U.S. Pat. No. 10,733,235, the content of which is incorporated herein in its entirety by reference.

FIELD OF THE DISCLOSURE

This disclosure relates in general to displaying text to aid dyslexic readers in reading the text.

BACKGROUND

Dyslexia may be defined as a learning disability that makes reading, writing, and spelling difficult. It has been identified as a neurological condition and is often inherited. Reading difficulties of individuals with dyslexia are widely attributed to phonological processing problems. Thus, teaching strategies for a dyslexic reader center around addressing these problems. For example, a dyslexic reader of the English language will practice the identification of individual sounds of the language and their association with a grapheme. Then, the sounds are blended into words.

SUMMARY

Researchers believe that causes of reading difficulties in dyslexic readers, other than phonological processing problems, exist. Studies do not conclusively support that a visual processing deficit contributes to the reading difficulties. However, reading text depends on a visual component. Many dyslexic readers easily understand spoken information. Thus, listening to text and/or listening to text in conjunction with reading the text can aid such readers. However, this aid is not always available and, when available, cannot always be used in the location where the reader is trying to read.

In contrast, the teachings herein adjust the text itself for display. The changes aid the dyslexic reader in decoding or processing text. In this way, reading fluency and reading comprehension may be improved.

An apparatus described herein includes a computing device. The computing device is configured to concurrently display, at a display screen, a first user interface element and a second user interface element of at least two user interface elements. The first user element displays sample text using first text settings, the second user element displays the sample text using second text settings, the sample text comprises multiple words, and a setting of the second text settings is different within the first text settings than within the second text settings such that the sample text displayed by the first user element is visually different from the sample text displayed by the second user element. The computing device is also configured to receive a selection of one of the at least two user interface elements, and store, in a non-transitory storage medium, text settings associated with the one of the at least two user interface elements as default text settings.

A method described herein includes concurrently displaying, at a computing device, a first user interface element and a second user interface element of at least two user interface elements. The first user element displays sample text using first text settings, the second user element displays the sample text using second text settings, the sample text comprises multiple words, and a setting of the second text settings is different within the first text settings than within the second text settings such that the sample text displayed by the first user element is visually different from the sample text displayed by the second user element. The method also includes receiving, at the computing device, a selection of one of the at least two user interface elements, and storing, in a non-transitory storage medium, text settings associated with the one of the at least two user interface elements as default text settings.

Another apparatus described herein includes a display screen and a computing device. The computing device is configured to receive a request to display written material on the display screen, access default text settings stored within a non-transitory storage medium, and receive a request to change the default text settings. The computing device is further configured to, responsive to the request to change the default text settings, concurrently display, at the display screen, a first user interface element and a second user interface element of at least two user interface elements. The first user element displays sample text using first text settings, the second user element displays the sample text using second text settings, the sample text comprises multiple words of the written material, and a setting of the second text settings is different within the first text settings than within the second text settings such that the sample text displayed by the first user element is visually different from the sample text displayed by the second user element. The computing device is further configured to receive a selection of one of the at least two user interface elements, and display, on the display screen, the written material using the text settings associated with the one of the at last two user interface elements.

Details of these embodiments, modifications of these embodiments and additional embodiments are described below.

BRIEF DESCRIPTION OF THE DRAWINGS

The description herein makes reference to the accompanying drawings wherein like reference numerals refer to like parts throughout the several views.

DETAILED DESCRIPTION

Figure 1:
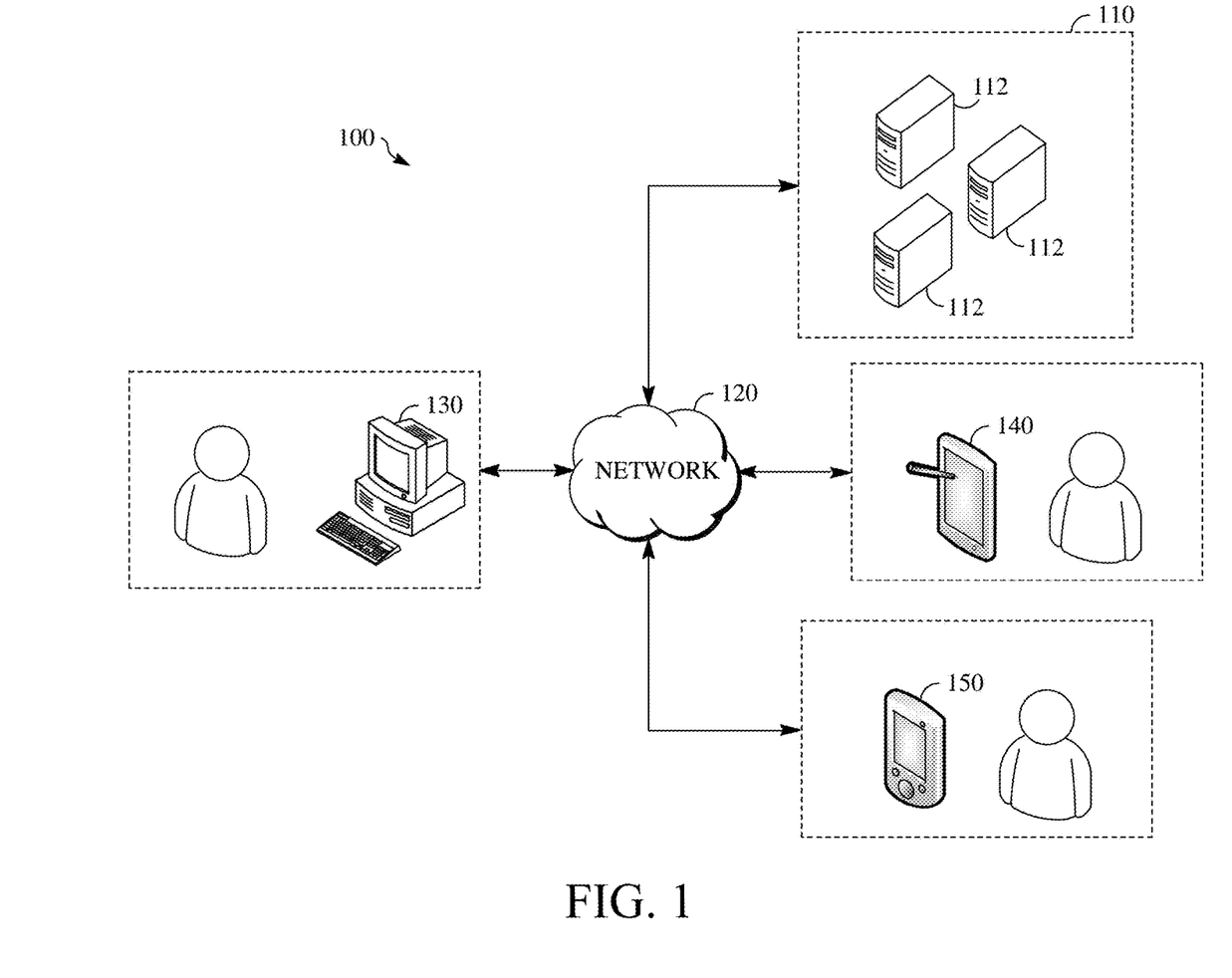
FIG. 1 is a block diagram showing an example of a network environment that in which embodiments of the present invention may be incorporated.

FIG. 1 is a block diagram that shows an example of a computing system 100 in which implementations of this disclosure may be incorporated. Computing system 100 may include a remote server system 110 having one or more server computers 112 coupled through a network 120 to one or more user devices that are associated a user, such as user devices 130, 140, 150.

As part of remote server system 110, any configuration of server computers 112 can be utilized. For example, certain of the operations described herein may be performed by server computers 112 in the form of multiple groups of server computers that are at different geographic locations and may or may not communicate with one another, such as by way of network 120. In some implementations of computing system 100 described herein, remote server system 110 is omitted.

Network 150 can be one or more communications networks of any suitable type in any combination, including wireless networks, wired networks, local area networks, wide area networks, cellular data networks and the Internet. Remote computing system 110 and user devices 130, 140, 150 can all communicate with each other via network 120. In the implementations described herein, User devices 130, 140, 150 all communicate with remove computing system 110. It should be understood, however, that the teachings herein may be implemented in manners that contemplate direct communication between any or all of user 130, 140, 150 via network 120.

The example of FIG. 1 shows the user devices of computing system 100 as a desktop computer 130, a tablet computer 140 and a smartphone 150. Other types of user devices may also be part of computing system 100 so long as the user device is able to reproduce stored text and other visual data to a user on a screen. For example, a watch, glasses, or other computing device, wearable or otherwise, that can display information in the user's field of vision may be a user device. Another example of a user device is a laptop computer. While three user devices are shown, fewer or more user devices may be part of computing system 100.

As explained in more detail hereinafter, computing system 100 is configured to retrieve text, adjust the text and present the adjusted text to a user on one or more user devices, such as user devices 130, 140, 150. Computing system 100 is also configured to generate and store the settings used to adjust the text. These functions may be performed in the context of an application that is used at a user device 130, 140, or 150 and is developed, published by, or otherwise attributable to a developer such as one associated with remote server system 110. Use of the application at a user device can include any or all of outputting information for display at the user device, receiving user input via an input device at the user device and executing computer program instructions at the user device 120. In some implementations, however, the application can be utilized at the user device without executing program instructions at the user device, such as by executing program instructions for the application at a different computing device (e.g., server computer 112).

Figure 2:
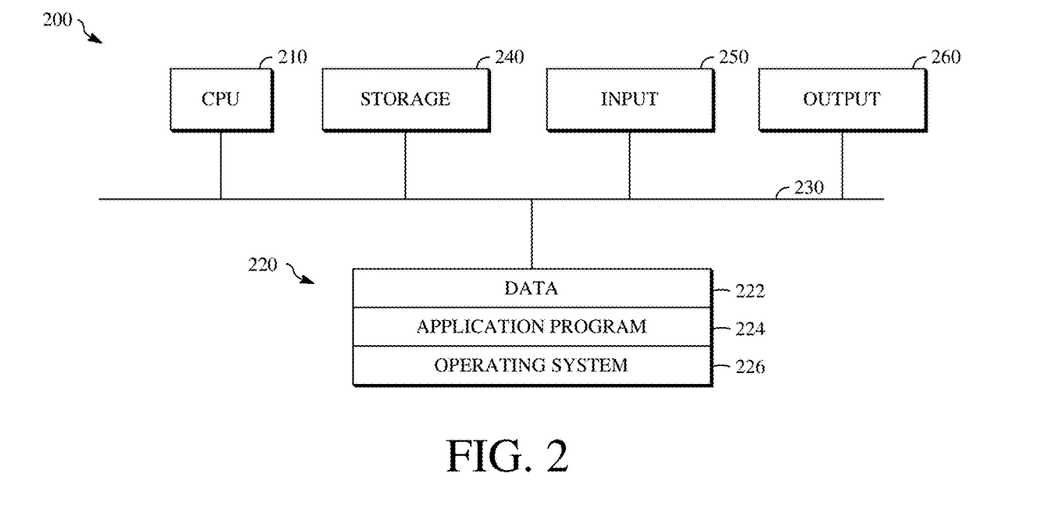
FIG. 2 is a block diagram showing an example of a hardware configuration for a computing device that may be used to implement the teachings herein.

FIG. 2 is a block diagram of an example of a hardware configuration for a computing device 200 that can be used to implement any or all of user devices 130, 140, 150, for example. The same hardware configuration or a similar hardware configuration can be utilized to implement a server computer 112 of remote computing system 110 when remote computing system 110 is included in computing system 100. In some implementations of remote computing system 110, the hardware configuration of one or more of server computers 112 is simplified to be used as cloud storage devices such as by omitting a display for a user.

Computing device 200 can include a CPU 210. CPU 210 may comprise one or more central processing units. Alternatively, CPU 210 can be any other type of device, or multiple devices, capable of manipulating or processing information now-existing or hereafter developed. Although the examples herein can be practiced with a single processor as shown, e.g., CPU 210, advantages in speed and efficiency may be achieved using more than one processor.

Computing device 200 can include a memory 220, such as a random-access memory device (RAM). Any other suitable type of non-transitory storage device can be used as memory 220. Memory 220 can include code and data 222 that can be accessed by CPU 210 using a bus 230. Memory 220 can further include one or more application programs 224 and an operating system 226. Application program 224 can include software components in the form of computer executable program instructions that cause CPU 210 to perform some or all operations and methods described herein.

A storage device 240 can be optionally provided in the form of any suitable non-transitory computer readable medium, such as a hard disc drive, a memory device, a flash drive, or an optical drive. One or more input devices 250, such as a keyboard, a mouse, a microphone, or a gesture-sensitive input device, receive user inputs and can output signals or data indicative of the user inputs to CPU 210. One or more output devices 260 can be provided. One output device 260 may be a display device, such as liquid crystal display (LCD) or a cathode-ray tube (CRT), which allows output to be presented to a user, for example, in response to receiving a request for text. Another output device 260 may be a speaker that prompts input from a user as described herein.

Although FIG. 2 depicts CPU 210 and memory 220 as being integrated into a single unit, other configurations can be utilized. The operations of CPU 210 can be distributed across multiple machines (each machine having one or more of processors) that can be coupled directly or across a local area or other network. Memory 220 can be distributed across multiple machines or devices such as network-based memory or memory in multiple machines performing operations that may be described herein as being performed using a single computer or computing device for ease of explanation. Although a single bus 230 is depicted, multiple buses can be utilized. Further, storage device 240 can be a component of each of computing device 200 or can be a shared device that is accessed via a network. Computing device 200 thus be implemented in a wide variety of configurations.

Figure 3:
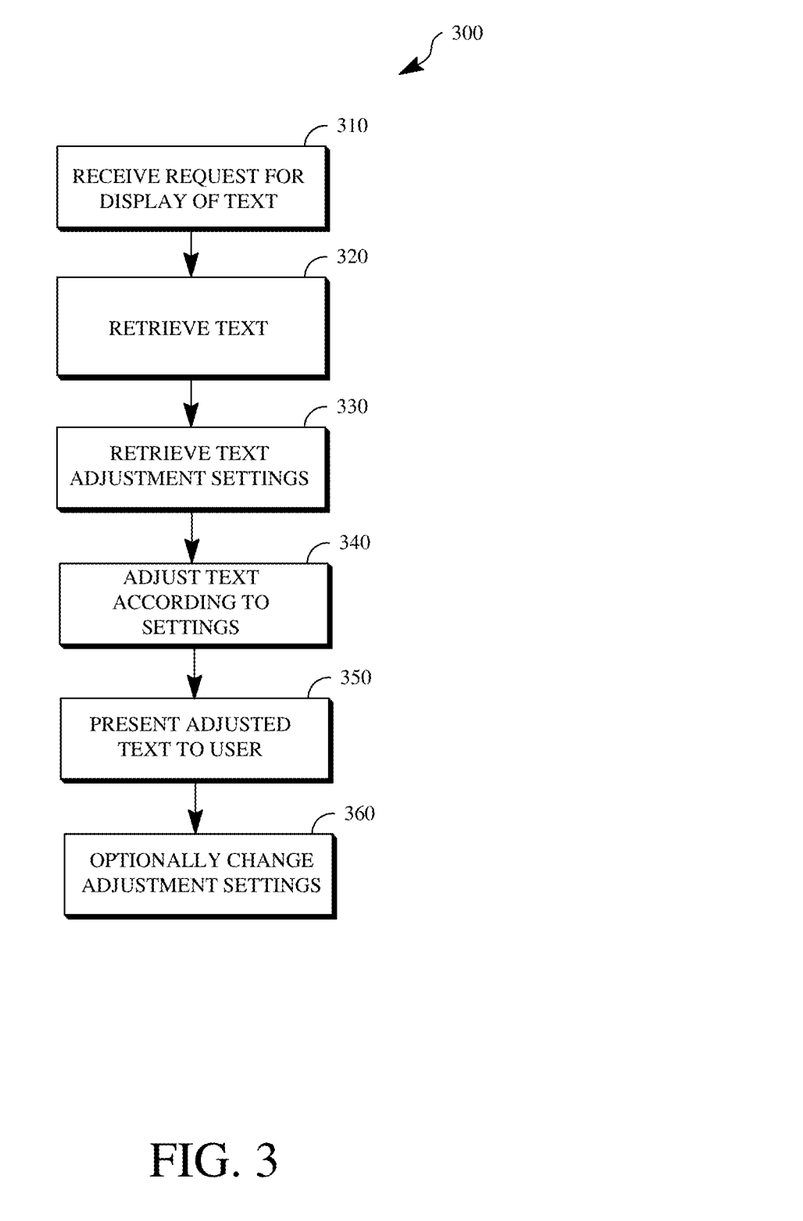
FIG. 3 is a flow chart showing an example of a process for presenting adjusted text to a user according to the teachings herein.

FIG. 3 is a flow chart showing an example of a process 300 for presenting adjusted text to a user. The operations described in connection with process 300 can be performed at one or more computing devices 200, such as a server computer 112 of remote computing system 110 or user device 130, 140 or 150. When an operation is performed by one or more computers, it is completed when it is performed by one computer. The operations described in connection with process 300 can be embodied as a storage device in the form of a non-transitory computer readable storage medium including program instructions executable by one or more processors that, when executed, cause the one or more processors to perform the operations. For example, the operations described in connection with process 300 could be stored at memory 220 of computing device 200 and be executable by CPU 210 of computing device 200.

At operation 310, a request is received for the display of text. The request can be received from user input. For example, the request can be an input into one or more input devices 250 that calls up a webpage on a web browser or a request to open an e-book. Any request for the display of text is possible. The request may be received and not transmitted to a remote source, such as server computer 112, or it may be received at a remote source, such as server computer 112, from a user device after receipt of the request at the user device. The request for the display of text may be made through one application, such as a web browser, etc., that triggers a separate application according to the teachings herein.

At operation 320, the text is retrieved responsive to the request. The text may be stored in any non-tangible storage medium. The text may be retrieved by receiving a stored file including the text transmitted over network 120. The text may be retrieved from local memory, such as storage 240. The text may also be retrieved by receiving a copy of the contents (i.e., the text) of such a stored file.

Upon retrieval of the text at operation 320, processing advances to operation 330 to retrieve text adjustment settings. Text adjustment settings are described in additional detail with reference to FIG. 4.

Text is adjusted according to the adjustment settings at operation 340. That is, the appearance of text within a stored file may have existing settings. The existing settings may also be based on default settings of a display device and/or an application through which the text is requested. The existing settings may include formatting options such as font, color, size, etc. The existing settings may also include layout options such as number of words per line, paragraph spacing, etc. The standard settings also include conventions for presenting text in a language such as English. For example, one convention arranges the text for reading from left to right and top to bottom (in English). Another convention provides which words and letters within a word are capitalized and which words are not capitalized. These and other conventions are generally assumed to be inviolate. Although the phrase "adjustment settings" is used herein, only one adjustment setting may be performed at operation 340. Each adjustment setting may be associated with a desired appearance of the text. If the text already conforms to one or more of those settings, there is no need to adjust the text in the particular way indicated by any particular adjustment setting.

After the text is adjusted at operation 340, the text is presented to the user at operation 350. Presenting the adjusted text to the user involves reproducing the adjusted text on a display for viewing by the user. Upon presentation of the text, the adjustment settings may optionally be further adjusted as described with reference to FIG. 4. Note that the order of operations may vary. For example, the text may be presented to the user before the adjustment at step 340.

Figure 4:
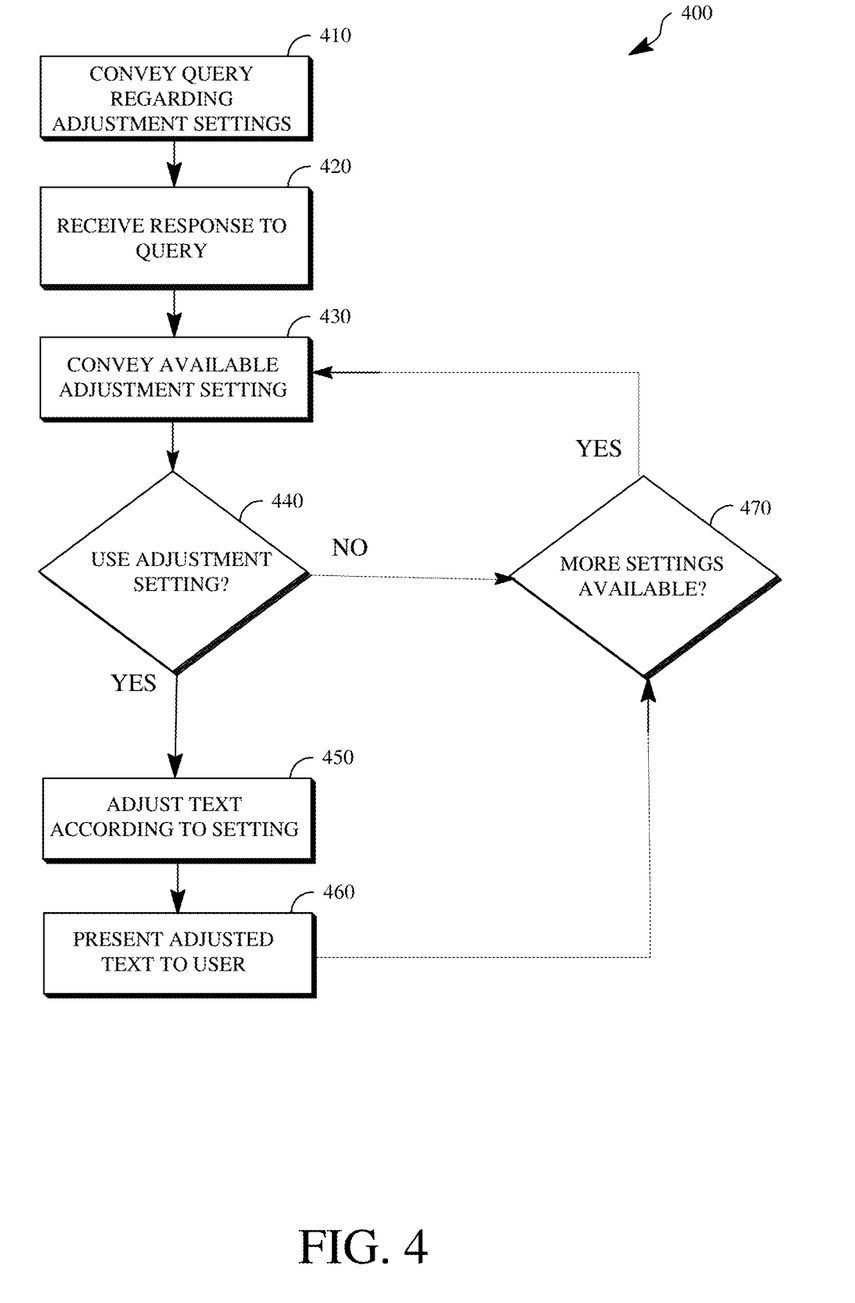
FIG. 4 is a flow chart showing an example of a process of setting or changing the text adjustments for the process of FIG. 3.

FIG. 4 is a flow chart showing an example of a process 400 of setting or changing the text adjustments for the process 300 of FIG. 3. More specifically, FIG. 4 shows how the text adjustment settings may be set at step 330 or changed at step 360. The operations described in connection with process 400 can be performed at one or more computing devices 200, such as a server computer 112 of remote computing system 110 or user device 130, 140 or 150. When an operation is performed by one or more computers, it is completed when it is performed by one computer. The operations described in connection with process 400 can be embodied as a storage device in the form of a non-transitory computer readable storage medium including program instructions executable by one or more processors that, when executed, cause the one or more processors to perform the operations. For example, the operations described in connection with process 400 could be stored at memory 220 of computing device 200 and be executable by CPU 210 of computing device 200.

At operation 410, a query regarding adjustment settings is conveyed to the user. The query can be conveyed responsive to, for example, the opening of a text adjustment application as described herein. The query may also be conveyed responsive to the presentation of text to user, either before it is adjusted or after it is adjusted and presented, at step 350 for example. Characters are the basic symbols used to write or print a language. For example, letters of the alphabet, numerals, punctuation marks and other symbols such as mathematical signs, the dollar sign, etc., are used as characters in the English language. Due to the processing difficulties of the dyslexic reader, it may be difficult to receive an accurate response from a user when the query is conveyed using only characters. That is, the user may not be able to select the desired response due to an error in processing a character-based prompt. Conveying the query thus desirably includes generating one or more visual or auditory prompts that are desirably non-character-based prompts or are otherwise recognizable or distinguishable (e.g., from each other when there is more than one) on a basis other than characters.

According to some implementations, the query may be generated as the desired responses using color and/or shapes on a display as the output 260 of a user device such as one of user devices 130, 140, 150. For example, buttons may be generated on a touch-sensitive display, such as a green button and a red button. In another example, the buttons may have different shapes, such as a round shape for one and an octagonal shape for another. So long as there is at least one non-character-based property identifying the prompt, in this case at least one non-character-based difference between the prompts, characters may also be generated in conjunction with each of the buttons. For example, the green and/or round button may include characters forming the word "YES" while the red and/or octagonal button may include characters forming the word "NO".

The query may be or include a vocal query from, for example, a speaker as the output 260 of a user device such as one of user devices 130, 140, 150. The vocal query may be a short phrase, optionally with instructions for how to respond. For example, the vocal query may be, "Change settings?" or "Change settings? Select green for yes and red for no." or "Change settings? Say yes or no."

At step 420, a response is received to the query. The response may be received at the input 250 of a user device such as one of user devices 130, 140, 150. For example, the response may be user contact with a button generated on a touch-sensitive display as the input 250. The response may also be a verbal response uttered by the user and picked up by a microphone as the input 250. If the response indicates that changes are not to be made, process 400 ends. Otherwise, process 400 advances to change the settings starting at operation 430.

At operation 430, an available adjustment setting is conveyed to the user. In some implementations described in more detail below, multiple available adjustment settings may be simultaneously conveyed to the user. The available adjustment setting may be conveyed as described previously with respect to operation 410. That is, an adjustment setting may be conveyed using one or more buttons or other display icons on a display that can be uniquely identified with at least one non-character-based identifier. Additionally, or alternatively, an adjustment setting may be conveyed in a vocal communication through a speaker. A vocal communication is also considered to provide a non-character-based identifier.

The adjustment setting may include a variety of possible settings to adjust text for the display. One adjustment setting may be a font type. For example, the font type may be OpenDyslexic, the free open-source font developed specifically for dyslexic readers, or to another font designed for dyslexic readers such as Dyslexie. Another font type may be one or more selections of a standard sans-serif font.

The size of the font is another possible adjustment setting that can be incorporated into implementations of the present invention. For example, a larger font may make processing of text easier for a dyslexic reader. Thus, the adjustment setting could be a minimum font size in one implementation. In other implementations, the adjustment setting could be a number of font sizes above a minimum font size from which the user or dyslexic reader may select.

Font changes may include changes to some and not all characters forming the text. Generally, the settings are used to accent portions of the text in an effort to make that text easier to process. For example, some dyslexic readers have difficulty detecting the end of sentences and other punctuation. One way in which this may be addressed is to include settings for punctuation marks so that they are darkened and enlarged as compared to the words and other symbols within the text.

Another setting may change certain letters from lower case to upper case throughout the text. This could include changing some or all letters b, d, p, q, h, y, t, f, n, u, m, w, and g. Another setting that may change the appearance of the text to add accents is color-coding vowels with a similar pronunciation. For example, a word or some portion of a word that forms a long "a" sound, together with one or more final consonants where applicable, may be colored red. In this implementation, word or word portions a, ay, ey, ai, eight, ake, ate, ame, ane, etc., may be in red font. Representations of a different vowel sound may be represented by a different font color. In this way, for example, a reader may more easily distinguish between the word "eight" and the word "height," which use similar letters but represent different vowel sounds.

Other options for the adjustment settings may delineate the accented syllable in a multi-syllabic word, such as by using a different color, line strength, etc, than that used by the remainder of the word. This setting may be implemented alone or in conjunction with hyphenating the multi-syllabic words. In some cases, it may be desirable to hyphenate a multi-syllabic word differently than the standard hyphenation. For this latter adjustment setting, the hyphenation may be based in part on the Slingerland Approach to teaching reading. For example, the word timed is conventionally hyphenated as "tim-ed". In a setting where non-standard hyphenation is used, the hyphenation of timed may be displayed as "time-d".

The appearance of the text may be changed in other ways by the adjustment settings other than by changing the appearance of the font itself. These settings may control the overall appearance of the text on a display page. For example, a possible adjustment setting could include settings for the kern size, i.e., the size of the space between letters, or settings for the size of the space between the lines of text. The spacing between words on a line may also form one or more adjustment settings. Further, the number of words per line could be limited to, for example, no more than three words per line. In one implementation, the text may be converted to columns of single words that are, e.g., read from top to bottom. Some or all text may be written backward.

The adjustment settings may also include one or more settings for the color of the background and/or the font. The settings may be selected to improve the visibility of the text vis-à-vis the background. This is not necessarily an increase in contrast—it may represent merely a change in contrast. For example, a setting for the background color may be off-white and/or a setting for the text may be gray.

As mentioned above, operation 430 involves conveying an available adjustment setting to the user. Responsive thereto, the user may indicate in one of several ways whether the conveyed adjustment setting should be used to adjust the text. For example, the user may provide a verbal response picked up by a microphone. In another example where the adjustment setting is conveyed by a display, user contact with the display may indicate whether to use the adjustment setting or not. The technique of conveying the possible adjustment setting at operation 430 may dictate how the response is made. Like conveying the query at operation 410, conveying the possible adjustment setting at 430 may include instructions for how to respond depending on whether the adjustment setting should be used or not.

When the query of operation 440 indicates that the user would like the adjustment setting used, the text is adjusted according to the setting at operation 450. Then, the adjusted text is presented to the user at operation 460 similarly to the presenting described with respect to operation 350. Although not shown, an optional step may include a query as to whether the adjustment setting should be kept or not. That is, if the user determines that the adjusted text does not provide any benefit, the adjustment to the text associated with the particular adjustment setting may be rejected.

Regardless of whether the adjustment setting is kept or not, process 400 advances to operation 470 to determine whether there are more adjustment settings available. If so, process 400 returns to operation 430 to convey the next available adjustment setting. For any conveyed adjustment setting, the user may choose not to use the adjustment setting at operation 440. When an adjustment setting is not used at operation 440, process 400 advances to operation 470 to determine whether other adjustment settings are available without adjusting the text. After all adjustment settings are either accepted or rejected by the user, process 400 ends. Desirably, the one or more adjustment settings selected (i.e., those used or accepted at operation 440) are stored automatically as default settings for use next time a request for the display of text is made at operation 310. In some implementations, process 400 may convey a query to the user as to whether one or more adjustment settings should be stored in a similar manner as described above with reference to operation 410 and receive a response in a similar manner as described above with reference to operation 420.

Process 400 is a sequential series of operations that conveys each available adjustment setting separately and then displays text using the setting before advancing to the next available adjustment setting. The particular way in which queries and available adjustment settings is not so limited as long as a query and/or the available adjustment settings are conveyed or presented in a way that distinguishes them to the user in some way other than characters. In other words, the dyslexic reader should be able to identify his or her selection without having to process characters, such as within any text that may be used to convey the queries and/or settings in some implementations. Further, process 400 does not have to be a sequential process as described in this example. Available adjustment settings may be conveyed and/or applied concurrently at least in part.

One example of how process 400 may be implemented with such modifications is described with reference to FIGS. 5A and 5B.

Figure 5A:
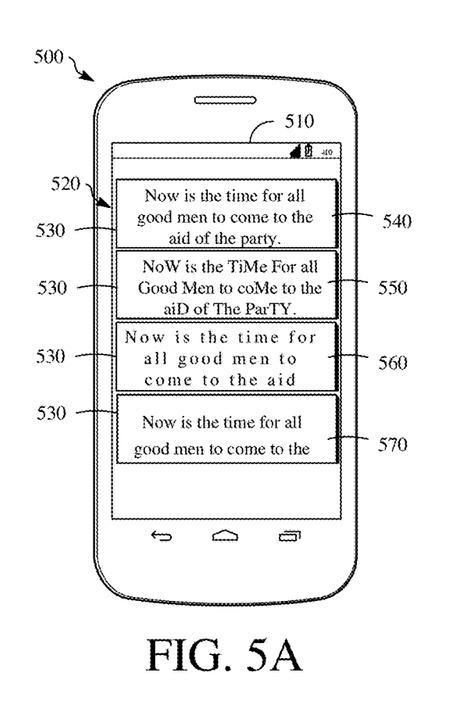
FIG. 5A is an illustration showing a user interface for displaying text before adjustments are applied.
Figure 5B:
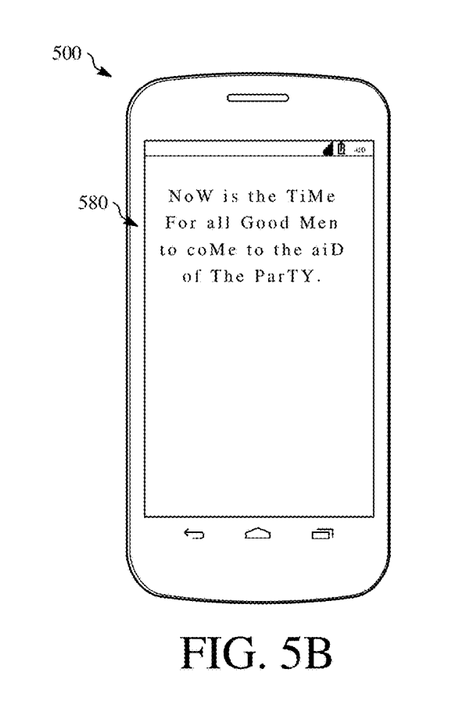
FIG. 5B is an illustration showing a user interface for displaying text after adjustments are applied.

FIG. 5A is an illustration showing one example of a user device 500 having a display screen 510 where a user interface 520 for a first example application is output for display at display screen 510. Although the description herein is not limited in its applicability to a particular type of layout, user interface 520 in the illustrated example uses a table view layout. Other layouts can be utilized, such as a grid view layout. User interface 520 can be utilized in the context of any type of application to deliver any type of information in text form. In this case, user interface 520 is used to concurrently convey a plurality of available adjustment settings through a plurality of user interface elements 530.

In some implementations, user interface elements 530 are static user interface elements that display content only. In other implementations, user interface elements 530 are active user interface elements that are activated in response to a user input (e.g., clicking or tapping the interface element). In the implementation shown, each of user interface elements 530 conveys a separate adjustment setting. For example, and responsive to an instruction from a user to set or revise the adjustment settings, the user interface elements 530 may be used to convey a sample text 540, sample text 540 modified by a first adjustment setting 550, sample text 540 modified by a second adjustment setting 560, and sample text 540 modified by a third adjustment setting 570. First adjustment setting 550 adjusts sample text 540 by changing certain letters into capital letters. Second adjustment setting 560 adjusts sample text 540 by kerning—namely, the spacing between adjacent letters is increased by fifty percent versus what is shown in sample text 540. Third adjustment setting 570 adjusts sample text 540 by increasing the line spacing by fifty percent. Display screen 510 is a scrolling display, so more adjustment settings could be accessed by scrolling display screen 510. Each user interface element 530 may also be scrolling or expandable to see additional text.

As mentioned above, the available adjustment settings are conveyed so that they are distinguishable on a basis other than characters. Here, this is done by delineating each of the adjustment settings within a separate user interface element 530. The user interface elements 530 may also be distinguished by color, such as coloring each a separate color (e.g., either the background or border) and/or by displaying the text in each user interface element 530 in a separate color. The use of the user interface elements 530 to convey the available adjustment settings may be supplemented by conveying audible instructions for how to respond. In one example, verbal input from the user may be requested. In the example shown, the user can contact each of the user interface elements 530 that allows the user to more accurately process the sample text 540. One contact by the user to a user interface element 530 can select an associated adjustment setting while another contact by the user can de-select the adjustment setting.

In still other implementations, user interface elements 530 can include both static user interface elements and active user interface elements. For example, samples of text similar to that in user interface elements 530 of FIG. 5A may be presented together with one or more buttons that can be used to select and/or de-select the adjustment setting associated with each sample. The button or buttons may be non-character-based prompts, such as red and green buttons or buttons having different shapes, so that they are distinguishable on a basis other than characters that may or may not be included on the display screen 510.

In still other implementations, user interface elements 530 can be GUI controls or GUI widgets.

Regardless of the technique used to convey and select the available adjustment settings, sample text 540 may be adjusted as described in operation 450 and presented to the user as described in operation 460 as part of process 400. In FIG. 5B, display screen 510 presents adjusted text 580 that is sample text 540 adjusted using adjustment settings 550, 560, 570 conveyed in FIG. 5A. Thereafter, the user may be given the option of keeping some or all settings and/or saving the selected one or more adjustment settings for use next time text is to be presented to a dyslexic reader in accordance with, for example, FIG. 3.

The foregoing description provides a wide range of options that can be changed individually or in groups to tailor published text on any number of user devices to the user's particular visual processing needs. The options, also called adjustment settings herein, can be saved as default settings in association with the user or user device to be used to modify text the next time the user makes a request for text. One or more settings could be changed after being applied to text. An interface with the user can convey the available settings to the user in such a way that the user does not necessarily have to visually process text to be able to distinguish between those settings. The interface could be or include a verbal interface.

While the invention has been described with reference to improving the visual processing of text by a dyslexic reader, the teachings herein could be used to improve visual processing by other readers such as visually-impaired readers.

To examine the improvement resulting from adjusted text according to the teachings herein, tests were performed on a tablet computer using a sample passage before and after six changes were made. First, the font size was enlarged from 16 point to 24 point. Second, the line height was increased from 1.5 to 3. Third, word spacing was increased from standard spacing to 5 spaces between words. Fourth, the kern was adjusted to 12 points. Fifth, all multisyllabic words were conventionally hyphenated. Sixth, letters b, d, p, q, h. y, f, t, w, m, n, and u (e.g., letters relying on a developed sense of direction, namely left and right and/or up and down) were adjusted to upper case. The following variables representing decoding errors were measured: omissions, insertions, substitutions, aided words repetitions, reversals, and total errors.

The variable omissions measures the number of words omitted when a reader reads text. The variable reversals measures the number of errors whereby a reader reads a word or portion of a word out of order. The variable substitutions measures the number of words read by a user that are substituted for other words within the text. The variable insertions measures the number of words added (e.g., due to guesses or predicted words) when a reader reads text. The variable aided words repetitions measures the number of times a word is first read incorrectly and is then corrected. Finally, the variable total errors accumulates all reading errors from the other variables.

For dyslexic readers at a third-grade level, there were significant reductions in the number of errors as reflected by the variables omissions, reversals, and total errors. For dyslexic readers at a fourth-grade level, there were significant reductions in the number of errors as reflected by the variables omissions, insertions, substitutions, and total errors. For dyslexic readers at a fifth-grade level, there were significant reductions in the number of errors as reflected by the variable omissions but a significant increase in the number of errors as reflected by the variable substitutions. For these readers, there was no significant reduction in the variable total errors. It is theorized that coping strategies developed by the fifth grade made reading the adjusted text more difficult and that other adjustment settings may be more successful.

As used herein, information, signals, or data are received by transmission or accessing the information, signals, or data in any form, such as receiving by transmission over a network, receiving by accessing from a storage device, or receiving by user operation of an input device.

The foregoing description describes only some exemplary implementations of the described techniques. Other implementations are available. For example, the particular naming of the components, capitalization of terms, the attributes, data structures, or any other programming or structural aspect is not mandatory or significant, and the mechanisms that implement the systems and methods described herein or their features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The implementations of the computer devices (e.g., clients and servers) described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. Further, portions of each of the clients and each of the servers described herein do not necessarily have to be implemented in the same manner.

Operations that are described as being performed by a single processor, computer, or device can be distributed across different processors, computers, or devices. Similarly, operations that are described as being performed by different processors, computers, or devices can, in some cases, be performed by a single processor, computer, or device.

Although features may be described above or claimed as acting in certain combinations, one or more features of a combination can in some cases be excised from the combination, and the combination may be directed to a sub-combination or variation of a sub-combination.

The systems described herein, such as client computers and server computers, can be implemented using general purpose computers/processors modified with a computer program that, when executed, carries out any of the respective methods, algorithms, and/or instructions described herein. In addition, or in the alternative, for example, special-purpose computers/processors can be utilized that contain specialized hardware for carrying out any of the methods, algorithms, or instructions described herein.

Some portions of above description include disclosure presented in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. It should be noted that the process steps and instructions of implementations of this disclosure could be embodied in software, firmware, or hardware, and when embodied in software, could be downloaded to reside on and be operated from different platforms used by real time network operating systems.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

At least one implementation of this disclosure relates to an apparatus for performing the operations herein. This apparatus may be specially constructed for the required purposes, or it may comprise a general-purpose computer selectively activated or reconfigured by a computer program stored on a computer readable storage medium that can be accessed by the computer.

All or a portion of the embodiments of the disclosure can take the form of a computer program product accessible from, for example, a non-transitory computer-usable or computer-readable medium. The computer program, when executed, can carry out any of the respective techniques, algorithms and/or instructions described herein. A non-transitory computer-usable or computer-readable medium can be any device that can, for example, tangibly contain, store, communicate, or transport the program for use by or in connection with any processor. The non-transitory medium can be, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for tangibly containing, storing, communicating, or transporting electronic instructions.

It is to be understood that the disclosure is not to be limited to the disclosed embodiments but, on the contrary, is intended to cover various modifications and equivalent arrangements included within the scope of the appended claims.

What is claimed is:

1. An apparatus, comprising:
a computing device configured to:
concurrently display, at a display screen, a first user interface element and a second user interface element of at least two user interface elements, wherein:
the first user element displays sample text using first text settings,
the second user element displays the sample text using second text settings, wherein the second text setting is changing formatting options of the sample text so that the sample text has hyphenation, different color, or line strength to assist a reader in reading the sample text,
the sample text comprises multiple words, and
a setting of the second text settings is different within the first text settings than within the second text settings such that the sample text displayed by the first user element is visually different from the sample text displayed by the second user element;
receive a selection of one of the at least two user interface elements; and
store, in a non-transitory storage medium, text settings associated with the one of the at least two user interface elements as default text settings;
a speaker of the computing device is configured to provide an audible instruction for how to select between the at least two user interface elements.

2. The apparatus of claim 1, wherein:
the computing device comprises a processor;
the processor is configured to convey, using an output device, an audible message to the user requesting the selection of the one of the at least two interface elements, and
each of the first user interface element and the second user interface element are each active interface elements, contact with which generates the selection of the one of the at least two user interface elements.

3. The apparatus of claim 1, wherein the computing device is configured to:
receive, a request for display of written material,
modify the written material using the default text settings; and
present, on the display screen, the written material using the default text settings.

4. The apparatus of claim 1, wherein the setting only applies to multi-syllabic words of the sample text.

5. The apparatus of claim 4, wherein the hyphenation is selected such that none of the words of the sample text are hyphenated as displayed by the first user element and at least one multi-syllabic word of the sample text is hyphenated as displayed by the second user element.

6. The apparatus of claim 5, wherein:
each of the multi-syllabic words of the sample text is hyphenated as displayed by the second user element; and
the hyphenation is a standard hyphenation.

7. The apparatus of claim 4, wherein the setting comprises delineation such that none of the words of the sample text are delineated as displayed by the first user element and at least some of the multi-syllabic words are delineated as displayed by the second user element, the delineation identifying an accented syllable in a multi-syllabic word differently than a remainder of the multi-syllabic word.

8. The apparatus of claim 7, wherein the delineation identifies the accented syllable using at least one of a different color or a different lines strength than the remainder of the multi-syllabic word.

9. A method, comprising:
concurrently displaying, at a computing device, a first user interface element and a second user interface element of at least two user interface elements, wherein:
the first user element displays sample text using first text settings,
the second user element displays the sample text using second text settings, wherein the second text setting includes accents, different colors, or different line strengths to assist a user in identifying which selection is easier to read,
the sample text comprises multiple words, and
a setting of the second text settings is different within the first text settings than within the second text settings such that the sample text displayed by the first user element is visually different from the sample text displayed by the second user element;
receiving, at the computing device, a selection of one of the at least two user interface elements; and
storing, in a non-transitory storage medium, text settings associated with the one of the at least two user interface elements as default text settings;
wherein the setting of the second text comprises at least one of:
adjusting a spacing between adjacent words; or
adjusting a number of words per line.

10. The method of claim 9, wherein:
a change in the setting from the first text settings and the second text settings is determined to reduce a decoding error by a user reading written material displayed using the second text settings as compared to using the first text settings.

11. The method of claim 10, wherein the decoding error comprises at least one of:
omissions indicating a number of words omitted when a reader reads the written material;
reversals indicating a number of errors whereby a reader reads a word or portion of a word out of order;
substitutions indicating a number of words read by a user that are substituted for other words within the written material;
insertions indicating a number of words added when a reader reads the written material; or
aided words repetitions indicating a number of times a word is first read incorrectly and is then corrected.

12. The method of claim 9, wherein the setting comprises punctuation mark accents such that a punctuation mark at an end of a sentence of the sample text includes the different color so that the text is darkened and enlarged as compared to words and other symbols of the sentence as displayed by the second user element.

13. The method of claim 9, wherein the setting comprises the accents and the accents are vowel sound accents such that words or word portions of the sample text having a common vowel sound are represented by a common font color different from remaining words or word portions of the sample text as displayed by the second user element.

14. The method of claim 9, wherein the setting comprises capitalization such that a certain letter is in lower case throughout the sample text as displayed by the first user element unless the certain letter is at a beginning of a sentence, and the certain letter is in upper case throughout the sample text as displayed by the second user element.

15. The method of claim 9, wherein the sample text comprises a sentence, and the setting comprises at least one of:
   a font size;
   a line height; or
   kerning.

16. The method of claim 9, further comprising:
   conveying, by a speaker of the computing device, an audible instruction for how to select between the at least two user interface elements.

17. The method of claim 16, wherein the audible instruction indicates one of:
   a physical input to provide to the computing device for a response; or
   a verbal input to provide to the computing device for the response.

18. An apparatus, comprising:
   a display screen;
   an audio interface configured to receive a verbal input from a user; and
   a computing device configured to process the verbal input from a user:
      receive a request to display written material on the display screen;
      access default text settings stored within a non-transitory storage medium;
      receive a request to change the default text settings;
      responsive to the request to change the default text settings:
         concurrently display, at the display screen, a first user interface element and a second user interface element of at least two user interface elements, wherein:
            the first user element displays sample text using first text settings,
            the second user element displays the sample text using second text settings,
            the sample text comprises multiple words of the written material, and
            a setting of the second text settings is different within the first text settings than within the second text settings such that the sample text displayed by the first user element is visually different from the sample text displayed by the second user element, wherein the second text settings vary from the first text settings in at least one of a kern size, number of words per line, settings for color of background and/or font, changing some text from lower case to upper case based on a cognitive impairment rule, change text from lower case to upper case irrelevant of a position of a certain letter within the word, or a combination thereof to assist a dyslexic reader in determining which of the first text settings or the second text settings is easier to read;
      receive a selection of one of the at least two user interface elements; and
      display, on the display screen, the written material using the text settings associated with the one of the at last two user interface elements.

* * * * *